United States Patent Office 3,534,064
Patented Oct. 13, 1970

3,534,064
CYCLIC ORGANIC COMPOUNDS
Heinz J. Dietrich, Bethany, Joseph V. Karabinos, Orange, and Maurice C. Raes, Branford, Conn., assignors to Olin Mathieson Chemical Corporation, a corporation of Virginia
No Drawing. Continuation-in-part of abandoned application Ser. No. 499,090, Oct. 20, 1965. This application Feb. 23, 1967, Ser. No. 617,826
Int. Cl. C07d 19/00
U.S. Cl. 260—338                      2 Claims

ABSTRACT OF THE DISCLOSURE

This invention discloses a series of trichloromethyl substituted polyoxacycloalkanes which are prepared by reacting chloral with cyclic acetals in the presence of an acidic catalyst. The new compounds are useful as pesticides, plasticizers and solvents. The invention also relates to polymers containing trichloromethyl substituted polyoxacycloalkane units. These polymers are prepared by reacting chloral with a polydivinyl acetal in the presence of an acidic catalyst, and are useful as safety glass interlaminate resins and protective coatings.

---

This application is a continuation-in-part of our copneding application, Ser. No. 499,090, filed Oct. 20, 1965 and now abandoned.

This invention relates to a series of selected acetals of chloral, and more specifically it relates to trichloromethyl substituted polyoxacycloalkanes having the following formula:

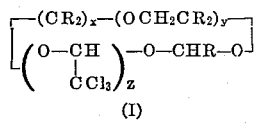

(I)

wherein each R is independently selected from the group consisting of hydrogen, alkyl, haloalkyl, cycloalkyl and oxyalkyl; $x$ is an integer of 2–20; $y$ is an integer of 0–3; and $z$ is an integer of 1–2. The invention also relates to polymers containing trichloromethyl substituted polyoxacycloalkane units.

It has now been found that the trichloromethyl substituted polyoxacycloalkanes I and the polymers described in detail below are provided in good yield and high purity by the reaction of chloral with cyclic acetals and polydivinyl acetals respectively in the presence of an acidic catalyst. The process of this invention does not involve the use of prolonged reaction periods at elevated temperatures, since the derivatives I are rapidly provided at ambient and even lower temperatures. This was a surprising and unexpected feature of this invention since it is known to those skilled in this art, as for example disclosed by Webb et al. in J. Chem. Soc., 1962, 4320, that acetals of chloral are difficult to provide and generally are only obtained when extreme experimental conditions are utilized. The formation of the derivatives I proceeds in accordance with the following equation where R, $x$, $y$, and $z$ are as previously defined.

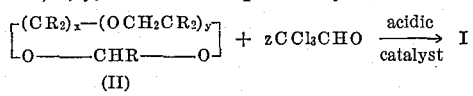

(II)

A wide variety of cyclic acetals II may be employed in the practice of this invention. For instance, many suitable acetals included in the general Formula II are disclosed in "The Ring Index" published by the American Chemical Society. In general the cyclic acetals II are conventionally provided by the reaction of mono- and polyalkylene glycols with an aliphatic aldehyde accompanied by elimination of water which proceeds in accordance with the following equation wherein R, $x$ and $y$ are as previously described.

$$HO-(CR_2)_x-(OCH_2CR_2)_y-OH + RCHO \rightarrow \quad II$$

Alternatively they are provided by the depolymerization of linear glycol based polyacetals caused by heating and/or exposure to acid catalysts.

The reaction of the cyclic acetals with chloral in accordance with this invention is general thus providing a method of preparing the broad class of cyclic derivatives encompassed in the Formula I. However there are compounds included in the general Formula I which represent preferred embodiments of this invention. For example, while cyclic acetals wherein $x$ is an integer of 2–20 may be utilized in the reaction with chloral, preferred compound embodiments are provided by the reaction of cyclic derivatives II wherein $x$ is 2–6 which are provided by the reaction of the lower alkylene glycols with an aliphatic aldehyde. Similarly while di-, tri-, and tetraalkylene glycols may be reacted with an aliphatic aldehyde to provide suitable cyclic acetals ($y$ being 1–3) for use in the practice of this invention, it is preferred to utilize those cyclic acetals provided from monoalkylene and dialkylene glycols (i.e., $y$ is 0–1).

Furnthermore, the preferred trichloromethyl substituted polyoxacycloalkanens of this invention include those derivatives I wherein each R independently represents hydrogen, alkyl having from 1 to 5 carbon atoms, chloroalkyl having from 1 to 5 carbon atoms and bromoalkyl having from 1 to 5 carbon atoms. Thus, the mono- and polyalkylene glycols and aliphatic aldehydes described previously wherein R represents the above moieties are preferred reactants in the preparation of the cyclic acetals II. Exemplificative of these preferred reactants are monoalkylene and dialkylene glycols such as ethylene glycol, 1,2-propylene glycol, 1,3-propylene glycol, 1,4-butylene glycol and isomers thereof, glycerol alphachlorohydrin, diethylene glycol, and glycerol bromochlorohydrin and aliphatic aldehydes such as formaldehyde, acetaldehyde, chloroacetaldehyde, dichloroacetaldehyde, bromoacetaldehyde and the like.

The polymers of this invention have repeating trichloromethyl substituted polyoxacycloalkane units of the following formula

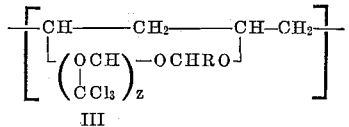

III and are provided by the reaction of polydivinyl acetals and chloral in accordance with the following equation wherein R and $x$ are as previously described, $n$ is an integer from about 5 to 500, and $m$ is an integer from about 1 to 5000, with the provision that $n$ is equal to or greater than $m$.

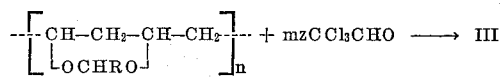

Thus, the reaction of the chloral with the polydivinyl acetal units occurs in random fashion and varying amounts of trichloromethyl substituted polyoxacycloalkane units III can be provided in the polymer.

The polydivinyl acetal polymers employed in this process are known materials and can be readily provided by a variety of methods for example, by the reaction of polyvinyl alcohol with an aliphatic aldehyde, or by the polymerization of divinyl acetals in accordance with the procedure described in U.S. Pat. 2,374,078. While any of the previously described polydivinyl acetals can be employed in the process of this invention preferred embodiments utilize polydivinyl formal, thereby providing polymers containing units having the Formula III where R is hydrogen.

The amount of chloral reactant essentially determines whether $z$ is 1 or 2. Thus when chloral and cyclic acetal are reacted in essentially equimolar quantities, a trichloromethyl substituted polyoxacycloalkane wherein $z$ is 1 is substantially provided although small amounts of the derivatives I where $z$ is 2 may also be obtained. However when two moles of chloral are used in reacting with a mole of cyclic acetal, essentially only those cyclic compounds I where $z$ is 2 are obtained. Similar considerations determine whether $z$ is 1 or 2 in the polymer containing the trichloromethyl substituted polyoxacycloalkane units III.

The process of this invention comprises reacting the cyclic acetals II or polydivinyl acetals with chloral at a temperature range of about −50° C. to about 200° C. in the presence of an acidic catalyst. A preferred reaction temperature range of 0° C. to 50° C. is however conveniently utilized in the preparation of the derivatives I and the polymers containing the units III.

As previously mentioned, an acidic catalyst is required in the process disclosed herein. A wide variety of suitable acids or acidic materials may be employed. For instance, any protonic acid which has a pK constant of 4 or less measured in water at 250° C. can be employed. Thus any of the well-known mineral acids may be utilized as well as many organic acids. Included among suitable catalysts of this nature are hydrochloric acid, sulfuric acid, phosphoric acid, hydrofluoric acid, and the like and for example p-toluenesulfonic acid.

Any of the Lewis type acids which are known to be active in Friedel-Crafts type reactions may be utilized in the practice of this invention. Suitable catalysts of this nature are listed for example by G. Olah in "Friedel-Crafts and Related Reactions," published by Interscience Publications, 1963–64. Included are the well-known catalysts such as $BF_3$, $AlCl_3$, $AlBr_3$, $FeCl_3$, $SnCl_4$, $TiCl_4$, $ZnCl_2$ $PF_5$ and the like. It has been found that heterogeneous acids including acidic clays i.e. fuller's earth) and acidic ion exchange resins are also suitably employed in the process of this invention.

The cyclic derivatives I and polymers containing the units III are provided by the process disclosed herein when as little as 10 p.p.m. of the aforementioned catalysts are employed based on combined weight of cyclic acetal and chloral reactants, or a polyvinyl acetal and chloral reactants respectively. Up to 5% by weight of catalyst can be employed if desired. However preferred catalyst concentration is about 60 p.p.m.–1% by weight based on total reactant weight.

The reactants described herein may be accomplished in the presence of inert organic diluents if desired. Suitable organic diluents include compounds such as benzene, toluene, hexane, pentane, dichloroethylene, chloroform, carbon tetrachloride and the like which do not contain an active hydrogen (i.e., alcohols and amines).

Upon completion of the reaction of the cyclic acetals or polydivinyl acetals with the chloral, the products are conveniently isolated by distillation, precipitation, filtration or centrifugation procedures. Generally, it is preferable to neutralize the acid catalyst prior to these purification procedures, but this is not absolutely necessary especially when the products have been obtained in the form of a solid precipitate. The products which are solid can be readily purified by recrystallization from appropriate organic solvents.

The preparation of the compounds I employing unsubstituted cyclic formals is usually accomplished by the formation of varying amounts of viscous linear copolymers of chloral and cyclic formals, especially if temperatures below 50° C. are employed in the reaction. It has been found that, after the products I are separated from these polymeric byproducts, further amounts of the compounds I can be obtained under identical conditions as described for the synthesis of the compounds I by depolymerizing these polymeric byproducts preferably at higher temperatures, i.e., 50° C. or higher.

The trichloromethyl substituted polyoxacycloalkanes I of this invention are useful in a variety of applications. They are valuable pesticides since they are effective in controlling the root-knot nematode, an obligate plant parasite which is particularly damaging to tomato and cucumber plants. They are useful plasticizers in selected polymer formulations. For instance these trichloromethyl substituted cyclic compounds can be admixed with cellulose acetate, polyvinylchloride, or polyvinylchloride-vinylacetate polymers to provide mixtures which by solution casting methods provide films marked by significantly improved flexibility and resistance to flame deterioration over the films provided from unplasticized polymers. The compounds are also good solvents at elevated temperatures for polyvinylchloride resins and other like plastic materials thus enabling these resins to be cast from solution admixed with other polymers. Finally the solubility characteristics of the compounds I make them useful selective solvents. For instance, they are miscible with aromatic and aliphatic hydrocarbons of low molecular weight, but are not miscible with mineral oils, machine oils and higher parafins in general.

The polymers which are the reaction products of polydivinyl acetals and chloral likewise have many useful applications. For example, they are valuable safety glass interlaminate resins. Furthermore, the introduction of chloral into the polymers increase their softening temperatures by about 10° to 50° C., thereby providing plastics that are useful as protective coatings for a wide range of materials. The presence of chlorine in the polymers also confers valuable flame retardant properties on these plastics, which can be mixed with other polymeric materials to provide flame-retardant polymer blends.

The following examples will serve to illustrate the preparation of several of the cyclic derivatives included in the Formula I and the polymers containing units represented by the Formula III.

EXAMPLE 1

222 g. (3 moles) of anhydrous 1,3-dioxolane, 442.2 g. (3 moles) of chloral and 10 g. of p-toluene sulfonic acid were refluxed under nitrogen for 1–2 hours until the pot temperature has reached 109°–110° C. After cooling to room temperature, an excess of sodium bicarbonate was added and the contents were distilled under reduced pressure. A clear water white liquid was obtained in the amount of 454 g., B.P. 122°–123° C./17 mm., M.P. 29.5°–30° C., $n_D^{25}$ 1.4911. The following analytical data revealed that 2-trichloromethyl-1,3,5-trioxepane had been obtained. This compound may also be referred to as 2-trichloromethyl-1,3,5-trioxacycloheptane.

*Analysis.*—Calcd. for $C_5H_7Cl_3O_3$ (percent): C, 27.1; H, 3.17; Cl, 48.1. Found (percent): C, 27.38; H, 3.18; Cl, 47.85.

Infrared spectral analysis revealed an absence of OH and C=O bands in the material. The osmometric molecular weight was 236 (calc. 221).

EXAMPLE 2

To a mixture of 29.4 g. (0.2 mole) of anhydrous chloral and 14.8 g. (0.2 mole) of 1,3-dioxolane was added 20 ml. of phosphorus pentafluoride gas from a syringe while excluding atmospheric moisture. After an exothermic reaction had subsided, the mixture was left at room temperature for 72 hours during which time it turned into a white solid. The solid was dissolved in 100 ml. of p-dioxane, neutralized with solid sodium bicarbonate, and poured into water wherein an oily organic layer was provided. The aqueous layer was decanted, and the residual organic layer was diluted with methanol, and again poured into water to provide a white precipitate. The water was decanted, and the precipitate was then dried and crystallized in a refrigerator to provide a 36.5 g. (82.5% yield) of 2-trichloromethyl-1,3,5-trioxepane, M.P. 29° C.

EXAMPLE 3

The procedure of Example 2 was exactly repeated except that 0.05 ml. of antimony pentachloride was utilized instead of the phosphorus pentafluoride. 2-trichloromethyl-1,3,5-trioxepane was again provided in the amount of 23.6 g.

EXAMPLE 4

To a mixture of 162 g. (1.1 moles) of anhydrous chloral and 37 g. (0.5 mole) of anhydrous 1,3-dioxolane was added 1 ml. of boron trifluoride-etherate. A very strong exotherm occurred. The mixture was left at room temperature in a brown jar over a period of 15 days. A crystalline precipitate was filtered off and recrystallized three times from hot ethanol to provide 15 g. of colorless crystals melting at 147° C. The infrared spectrum of this material showed the absence of hydroxyl- and carbonyl- groups and the presence of acetal- and trichloromethyl groups. The following elemental analysis revealed that 2,4-bis-(trichloromethyl)-1,3,5,8-tetraoxonane had been obtained. This compound may also be referred to as 2,4-bis-(trichloromethyl)-1,3,5,8-tetraoxacyclononane.

Analysis.—Calcd. for $C_7H_8Cl_6O_4$ (percent): C, 57.7. Found (percent): Cl, 57.6.

Nuclear magnetic resonance and infrared spectra also confirmed that the above compound had been obtained in high purity. The osmometric molecular weight was 377 (calc. 369).

The same compound was also obtained in high purity when 0.5 ml. of concentrated sulfuric acid was utilized as a catalyst instead of boron trifluoride-etherate.

EXAMPLE 5

To a mixture of 29.4 g. (0.2 mole) of chloral and 20.4 g. (0.2 mole) of 1,3-dioxepane maintained at 5° C. was added 0.05 ml. of boron trifluoride-etherate. After the mixture stood for 24 hours at 5° C. it had become very viscous. It was diluted with 100 ml. of p-dioxane, neutralized with two drops of triethanolamine and poured into an excess of water wherein an oily organic layer formed. The organic layer was separated and poured into 500 ml. of petroleum ether (B.P. 30°–60° C.). The petroleum ether was decanted from a viscous, polymeric precipitate. The petroleum ether fraction was partly evaporated and cooled, wherein a crystalline, colorless solid precipitated from solution. This solid was recrystallized from ethanol to provide 7.9 g. of a solid melting at 54°–55° C. The following analytical data revealed that 2-trichloromethyl-1,3,5-trioxonane had been obtained.

Analysis.—Calcd. for $C_7H_{11}Cl_3O_3$ (percent): C, 33.8; H, 4.42; Cl, 42.5. Found (percent): C, 34.2; H, 4.5; Cl, 41.5.

Infrared and nuclear magnetic resonance analyses confirmed that the above compound had been provided. The osmometric molecular weight was 278 (calc. 249).

EXAMPLE 6

To a mixture of 29.4 g. (0.2 mole) of chloral and 23.6 g. (0.2 mole) of 1,3,6-trioxocane was added 0.075 ml. of boron trifluoride-etherate at 5° C. After 24 hours standing at 5° C., the mixture was worked up in the same manner as described in Example 5. After recrystallization from ethanol, 7.6 g. of a white solid melting at 72°–74° C. was obtained. The following analytical data revealed that 2-trichloromethyl-1,3,5,8-tetraoxonane had been obtained. This compound may also be referred to as 2-trichloromethyl-1,3,5,8-tetraoxacyclodecane.

Analysis.—Calcd. for $C_7H_{11}Cl_3O_4$ (percent): C, 31.7; H, 4.1; Cl, 40.2. Found (percent): C, 31.7; H, 4.3; Cl, 39.9.

The above structure was also confirmed by infrared and nuclear magnetic resonance analyses. The osmometric molecular weight was 277 (calc. 265).

EXAMPLE 7

To a mixture of 48.4 g. (0.55 mole) of 2-methyl-1,3-dioxolane and 81 g. (0.55 mole) of anhydrous chloral, maintained under nitrogen at a temperature of 0° to 5° C., was added 5 ml. of phosphorus pentafluoride gas. The reaction mixture was left at 5° C. for 5 days during which time large, colorless crystals separated from the mixture. These crystals were filtered off and recrystallized from methanol to provide 78 g. (60.0% yield) of colorless crystals melting at 59–60° C., B.P. 58° C./0.2 mm. Hg. The following analytical data revealed that 2-methyl-4-trichloromethyl-1,3,5-trioxepane had been obtained.

Analysis.—Calcd. for $C_6H_9Cl_3O_3$ (percent): C, 30.59; H, 3.85; Cl, 45.16. Found (percent): C, 30.66; H, 3.81; Cl, 45.10.

Nuclear magnetic resonance and infrared analysis confirmed that the above product had been obtained. The osmometric molecular weight was 239 (calcd. 235.5).

EXAMPLE 8

Following the procedure of Example 7, 61.3 g. (0.5 mole) of 4-chloromethyl-1,3-dioxolane were reacted with 73.7 g. (0.5 mole) of anhydrous chloral in the presence of 21.7 ml. of phosphorus pentafluoride gas. The mixture was left in a refrigerator for 6 days and then distilled to provide 100.3 g. (82.0% yield) of a liquid, B.P. 94–96° C./0.1 mm. Hg, M.P. 47–63° C., $n_D^{25}$ 1.5051 (supercooled.) Nuclear magnetic resonance, infrared analysis and the following analytical data revealed that an isomeric mixture of 6-chloromethyl-2-trichloromethyl-1,3,5-trioxepane and 6-chloromethyl-4-trichloromethyl-1,3,5-trioxepane had been obtained.

Analysis.—Calcd. for $C_6H_8Cl_4O_3$ (percent): C, 26.70; H, 2.98; Cl, 52.24. Found (percent): C, 26.75; H, 2.94; Cl, 52.4.

The osmometric molecular weight was 267 (calcd. 269.9).

EXAMPLE 9

The procedure of Example 8 was repeated exactly except that 0.128 ml. of antimony pentafluoride was utilized instead of the phosphorus pentafluoride. An isomeric mixture of 6-chloromethyl-2-trichloromethyl-1,3,3-trioxepane and 6-chloromethyl-4-trichloromethyl-1,3,5-trioxepane was again provided.

EXAMPLE 10

To a solution of 3 g. (0.03 mole of formal units) of polydivinyl formal having an average molecular weight of 3900 in 25 ml. (0.25 mole) of anhydrous chloral was added, with stirring, 2 drops of concentrated sulfuric acid. After standing in a moisture-free atmosphere at 25° C. for 20 hours, the mixture was poured into a methanol/pyridine solution wherein a solid precipitated from the mixture. This solid was filtered and reprecipitated three times from a solution of benzene into methanol thereby providing 3.95 g. of a light tan powder. Elemental analysis revealed that the product contained 15.7 percent by weight chlorine.

EXAMPLE 11

The procedure of Example 10 was repeated exactly except that 2 drops of boron trifluoride-etherate were employed instead of the concentrated sulfuric acid. A light tan powder was again provided in the amount of 2.7 g. having a chlorine content of 2.04 percent by weight.

EXAMPLE 12

Anhydrous benzene was added to 3.9 g. (0.039 mole formal units) of polydivinyl formal and 5.9 g. (0.04 mole) of anhydrous chloral to provide 39 ml. of reaction mixture. Three drops of antimony pentachloride were added with stirring while maintaining the mixture under nitrogen at room temperature. After standing for 20 hours, an excess of sodium bicarbonate was added and most of the solvent evaporated under reduced pressure. The residual solution was poured into a methanol/pyridine solution to provide a precipitate. This solid was filtered and reprecipitated three times from benzene into methanol to provide 2.95 g. of a light tan powder containing 2.32 percent by weight of chlorine.

EXAMPLE 13

The procedure of Example 12 was repeated, except that 0.1 ml. of boron trifluoride-etherate were utilized instead of the antimony pentafluoride. A light tan powder in the amount of 2.9 g. and having a chlorine content of 9.15 percent by weight was obtained.

EXAMPLE 14

The procedure of Example 12 was repeated using 0.25 ml. of ethyl-aluminum dichloride instead of antimony pentafluoride. The product, which was obtained in the amount of 3.9 g., contained 2.6 percent by weight of chlorine.

What is claimed is:
1. 2,4-bis(trichloromethyl)-1,3,5,8-tetraoxonane.
2. 2-trichloromethyl-1,3,5,8-tetraoxecane.

References Cited

UNITED STATES PATENTS

| | | | |
|---|---|---|---|
| 2,475,610 | 7/1949 | Gresham et al. | 260—338 |
| 2,595,304 | 5/1952 | Schroeder | 260—340.7 |
| 2,310,943 | 2/1943 | Dorough et al. | 260—73 |
| 2,316,921 | 4/1943 | Weihe et al. | 260—73 |
| 2,532,340 | 12/1950 | Schroeder | 260—338 X |
| 2,725,383 | 11/1955 | Astle et al. | 260—338 X |

FOREIGN PATENTS 518,548  11/1955  Canada.

OTHER REFERENCES

Pinner, A., Berichte, vol. 31 (1898), pp. 1926–31.
Webb et al., Jour. Chem. Soc., November 1962, pp. 4320–3.

NORMA S. MILESTONE, Primary Examiner

U.S. Cl. X.R.

260—73